(12) United States Patent
Christmann et al.

(10) Patent No.: US 9,163,125 B2
(45) Date of Patent: Oct. 20, 2015

(54) METHOD OF PREPARING A TRANSPARENT POLYMER MATERIAL COMPRISING A THERMOPLASTIC POLYCARBONATE AND SURFACE-MODIFIED MINERAL NANOPARTICLES

(75) Inventors: Anne Christmann, Ales (FR); Jean-Francois Hochepied, Paris (FR); Jose-Marie Lopez-Cuesta, St Christol les Ales (FR); Laure Meynie, Paris (FR); Alexandra Roos, Charenton-le-Pont (FR); Nathalie Cornet, Voisins-le-Bretonneux (FR); Karine Cavalier, Arles (FR); Didier Sy, Salin de Giraud (FR); Marc Lacroix, Louvain-la-Neuve (BE)

(73) Assignees: ARMINES, Paris (FR); ESSILOR INTERNATIONAL (COMPAGNIE GENERALE D'OPTIQUE), Paris (FR); SOLVAY SA, Brussels (BG)

( * ) Notice: Subject to any disclaimer, the term of this patent is extended or adjusted under 35 U.S.C. 154(b) by 425 days.

(21) Appl. No.: 12/744,529

(22) PCT Filed: Dec. 9, 2008

(86) PCT No.: PCT/EP2008/067076
§ 371 (c)(1),
(2), (4) Date: Oct. 29, 2010

(87) PCT Pub. No.: WO2009/074554
PCT Pub. Date: Jun. 18, 2009

(65) Prior Publication Data
US 2011/0034585 A1 Feb. 10, 2011

(30) Foreign Application Priority Data
Dec. 13, 2007 (FR) .................................. 07 59810

(51) Int. Cl.
| | | |
|---|---|---|
| C08K 9/00 | (2006.01) | |
| C08J 5/00 | (2006.01) | |
| B82Y 30/00 | (2011.01) | |
| C08K 3/22 | (2006.01) | |
| C08K 3/26 | (2006.01) | |
| C08K 5/5425 | (2006.01) | |

(52) U.S. Cl.
CPC ................. *C08J 5/005* (2013.01); *B82Y 30/00* (2013.01); *C08K 3/22* (2013.01); *C08K 3/26* (2013.01); *C08J 2369/00* (2013.01); *C08K 5/5425* (2013.01)

(58) Field of Classification Search
CPC ......... C08L 25/06; C08L 69/00; C08L 33/12; C08K 3/08
USPC ........... 524/423, 425; 523/200, 205, 209, 212
See application file for complete search history.

(56) References Cited

U.S. PATENT DOCUMENTS

| | | | |
|---|---|---|---|
| 5,494,949 A * | 2/1996 | Kinkel et al. ................. 523/212 |
| 5,831,963 A * | 11/1998 | Harada et al. ............. 369/275.3 |
| 7,081,488 B2 * | 7/2006 | Bardman et al. ............. 523/200 |
| 2006/0121190 A1 * | 6/2006 | Tsujino et al. ................ 427/226 |
| 2007/0190314 A1 * | 8/2007 | Aiki et al. ...................... 428/327 |
| 2007/0208123 A1 * | 9/2007 | Kambe et al. ................. 524/432 |
| 2008/0015329 A1 | 1/2008 | Seino et al. |
| 2008/0119631 A1 * | 5/2008 | Mullen ......................... 528/203 |
| 2008/0193731 A1 * | 8/2008 | Laney et al. .................. 428/220 |
| 2011/0034588 A1 * | 2/2011 | Boucher et al. ............... 523/351 |

FOREIGN PATENT DOCUMENTS

| | | |
|---|---|---|
| JP | 2007002049 | 1/2007 |
| WO | 2006019008 | 2/2006 |
| WO | 2007059843 | 5/2007 |

OTHER PUBLICATIONS

French Search Report dated May 2, 2008.
Polycarbonate nanocomposites. PArt 1. Effect of organoclay structure on morphology and properties. P.J. Yoon, D.L. Hunter, D.R. Paul.

* cited by examiner

*Primary Examiner* — Hannah Pak
(74) *Attorney, Agent, or Firm* — Sofer & Haroun, LLP

(57) ABSTRACT

A method of preparing a transparent polymer material includes i) obtaining composite nanoparticles having mineral nanoparticles at least partially coated with at least one monomer and/or at least one polymer suitable for promoting physicochemical interactions at the interface between the mineral nanoparticles and a thermoplastic polycarbonate matrix, the mineral nanoparticles being surface-modified by the monomer and/or the polymer, either directly by grafting or directly by adsorption of the monomer and/or polymer onto the surface of the mineral nanoparticles; or via a coupling agent selected from a chlorosilane or an organosilane including a functional group that is capable of reacting by a radical pathway. The composite nanoparticles obtained in step i) are mixed with the thermoplastic polycarbonate matrix in the molten state to obtain the transparent polymer material.

18 Claims, No Drawings

METHOD OF PREPARING A TRANSPARENT POLYMER MATERIAL COMPRISING A THERMOPLASTIC POLYCARBONATE AND SURFACE-MODIFIED MINERAL NANOPARTICLES

RELATED APPLICATIONS

This application is a National Phase application of PCT/EP2008/067076, filed on Dec. 9, 2008, which in turn claims the benefit of priority from French Patent Application No. 07 59810, filed on Dec. 13, 2007, the entirety of which are incorporated herein by reference

BACKGROUND

1. Field of the Invention

The present invention relates to a method of preparing a transparent polymer material comprising a thermoplastic polycarbonate and surface-modified mineral nanoparticles, as well as to a transparent polymer material obtained by said method.

The invention typically, but not exclusively, applies to the fields of optics, in particular optical articles of the automobile glass type, and to optical articles of the sighting instrument lens type, of the helmet visor type, or of the ophthalmic lens type.

More particularly, the term "automobile glass" not only means external transparent bodywork elements such as rear lights, side panels, side windows, glazed roofs, headlight or sidelight glazing, but also transparent elements for the interior, such as dashboard, dial, or screen glazing.

The term "ophthalmic lens" means lenses that are in particular suitable for mounting in eyeglasses, having the function of protecting the eye and/or correcting vision, such lenses being selected from afocal, unifocal, bifocal, trifocal and progressive lenses.

2. Description of Related Art

Polycarbonate enjoys advantages that render it particularly advantageous for optics, in particular excellent transparency, excellent shock resistance, a high refractive index and very light weight. In contrast, its principal disadvantages lie in it not being very rigid and being sensitive to scratching and abrasion.

In order to improve the mechanical properties of a polymer, in particular rigidity and abrasion and scratch resistance, it is known to add mineral nanoparticles to the polymer.

Typically, said mineral nanoparticles are incorporated directly into the polymer in the molten state.

However, the nanometric dimension of the mineral nanoparticles inevitably introduces a phenomenon of aggregation of said nanoparticles while being mixed into a thermoplastic polycarbonate matrix in the molten state.

For this reason, the polymer material obtained using that method loses transparency and also suffers coloration, in particular yellowing, rendering it difficult to use in optical fields.

Furthermore, incorporating mineral nanoparticles may induce degradation of the mechanical properties of the polymer material such as its shock resistance, for example.

Thus, in order to improve the quality of the interface between the nanoparticles and the thermoplastic polycarbonate matrix and to thereby improve the mechanical and optical properties of the polymer material, it is known from document EP-1 767 562 to use a method of preparing transparent polymer materials comprising a thermoplastic polycarbonate and surface-modified mineral nanoparticles.

That method consists in grafting a monomer for the thermoplastic polycarbonate matrix onto the surface of the mineral nanoparticles via an aliphatic ether bond, and then polymerizing said monomer in situ to form the thermoplastic polycarbonate matrix.

Thus, modification of the surface of said mineral nanoparticles cannot be dissociated from the thermoplastic polycarbonate matrix.

As a consequence, that prior art preparation method is industrially limited since only polycarbonate can be used to modify the surface of said mineral nanoparticles.

Furthermore, that method involves the use of a specific reactor to polymerize the thermoplastic polycarbonate matrix; that use is relatively restrictive.

OBJECTS AND SUMMARY

The object of the present invention is to overcome the disadvantages of the prior art solutions, in particular by proposing a method of preparing a transparent polymer material that can readily be industrialized, while preserving or even improving the optical and mechanical properties of the polymer material obtained by said method.

The solution according to the present invention is to propose a method of preparing a transparent polymer material, the method comprising the following steps:

i) obtaining composite nanoparticles comprising mineral nanoparticles coated with at least one monomer and/or at least one polymer suitable for promoting physicochemical interactions at the interface between the mineral nanoparticles and a thermoplastic polycarbonate matrix, said mineral nanoparticles being surface-modified by said monomer and/or said polymer:

either directly by grafting or directly by adsorption of the monomer and/or polymer onto the surface of said mineral nanoparticles;

or via a coupling agent selected from a chlorosilane or an organosilane including a functional group that is capable of reacting by a radical pathway; and ii) mixing the composite nanoparticles obtained in step i) with a thermoplastic polycarbonate matrix in the molten state to obtain said transparent polymer material.

The preparation method of the present invention can significantly improve the cohesion of the thus modified mineral nanoparticles with the thermoplastic polycarbonate matrix and disperse said nanoparticles in a homogeneous manner in said matrix.

The coupling agent advantageously mediates to bond the monomer and/or the polymer to the surface of the mineral nanoparticles when said monomer and/or said polymer cannot be bonded directly to said surface.

The particular modes of grafting or adsorption may be envisaged as the creation of physical or chemical interactions of the hydrogen bond or Van der Waals bond type between firstly the mineral nanoparticles and secondly the monomer and/or the polymer according to the invention.

The surface modifications to the mineral nanoparticles of the adsorption type or of the type to create physical or chemical interactions of the hydrogen bond or Van der Waals bond type with the monomer and/or the polymer are preferably carried out directly at the surface of said nanoparticles, or in other words without a coupling agent.

In a first particular preparation method P1, defined as being with a coupling agent, the surface modification of the mineral nanoparticles may advantageously be accomplished by creating a covalent bond firstly between the mineral nanoparticles and the coupling agent, and secondly between the coupling agent and the monomer and/or the polymer.

In a second particular preparation method P2, defined as being direct or without a coupling agent, the surface modification of the mineral nanoparticles may be carried out by creating a covalent bond directly between the mineral nanoparticles and the monomer and/or the polymer, or by direct adsorption of the monomer and/or polymer onto the surface of said mineral nanoparticles.

Furthermore, and in accordance with step i) of the preparation method of the present invention, when the surface of the mineral nanoparticles is modified by a polymer, said polymer may be obtained by polymerization of its monomer (in situ polymerization) whether or not it is in the presence of a coupling agent.

More particularly, the monomer of step i) is grafted to the surface of mineral nanoparticles, then it is polymerized.

In general, said polymerization requires the presence of an initiator that is capable of generating free radicals under the effect of actinic or thermal radiation.

In accordance With a first variation of the polymerization, when the surface modification is obtained using a coupling agent in accordance with the invention, in particular when using an organosilane, the agent is initially grafted onto the surface of the mineral nanoparticles. Next, the monomer is grafted onto the surface of the mineral nanoparticles via said organosilane or, in other words, the monomer is typically grafted to said organosilane. Finally, the monomer is polymerized.

In accordance with a second polymerization variation, when the surface modification is direct, i.e. with no coupling agent, the monomer is grafted directly onto the surface of the mineral nanoparticles, and then it is polymerized.

Clearly, when the surface of the mineral nanoparticles is modified by a monomer in accordance with the invention, said monomer is not necessarily polymerized. The mineral nanoparticles are then at least partially coated with said monomer as such.

In accordance with the present invention, the composite nanoparticles obtained in step i) may advantageously comprise at least 60% by weight of organic coating, preferably a quantity in the range 5% to 50% by weight of organic coating.

The term "organic coating" means the organic layer formed around the mineral nanoparticles, said layer being obtained from monomer and/or polymer, and optionally coupling agent.

The term "transparent polymer material" means a material through which an image is observed with no significant loss of contrast.

In other words, interposing said transparent polymer material between an image and an observer of the image does not significantly reduce the quality of the image.

The term "molten state" means a state in which the thermoplastic polycarbonate matrix of step ii) is in a malleable state. This malleable state, well known to the skilled person, may conventionally be obtained when said matrix is heated to a temperature above the glass transition temperature, or softening temperature, of the thermoplastic polycarbonate.

In the text of the present invention, the expression "in the range value x to value y" means that the values x and y are included in the range of values.

The physicochemical interactions at the interface between the mineral nanoparticles and the thermoplastic polycarbonate matrix, more particularly the miscibility, compatibility, and/or chemical affinity between the mineral nanoparticles and said matrix, may advantageously be promoted when the monomer at the surface of the composite nanoparticles is in particular styrene, methyl methacrylate, butyl acrylate, bisphenol A, phosgene, diphenyl carbonate, and/or acrylamide.

Bisphenol A, phosgene, and diphenyl carbonate are well known monomers for polycarbonate.

Said physicochemical interactions may also advantageously be promoted when the polymer at the surface of the composite nanoparticles is in particular polystyrene, polycarbonate, polymethyl methacrylate, polybutyl acrylate, and/or polyacrylamide, and more particularly a copolymer of styrene, polycarbonate monomer, methyl methacrylate, butyl acrylate, bisphenol A, and/or acrylamide.

In accordance with the present invention, the functional group of the organosilane is a functional group that can react by a radical pathway, and that can thereby create a covalent bond by a radical addition mechanism in the presence of an initiator, said initiator being capable of generating free radicals under the effect of actinic or thermal radiation.

The reactive functional group may advantageously be selected from an acrylate, methacrylate, vinyl, allyl, or alkenyl group, preferably a vinyl group.

The organosilane of the present invention may also comprise a hydrolysable functional group.

This functional group is capable, in particular, of forming covalent bonds on the surface of the mineral nanoparticles; more particularly, it is capable of forming covalent bonds with the hydroxyl groups that may be present on the surface of said nanoparticles.

The hydrolysable functional group may be linear or branched and selected from a carboxy or alkoxy group, preferably $C_1$-$C_6$. An ethoxy or methoxy group may in particular be mentioned.

Examples of organosilanes in accordance with the present invention that may be mentioned are vinyl trimethoxysilane and methacryloxypropyl trimethoxysilane.

Typically, at least one of the dimensions of the mineral nanoparticles of the present invention is nanometric ($10^{-9}$ meter) in scale.

The term "dimension" means the number average dimension of the set of nanoparticles of a given population, said dimension being determined conventionally using methods that are well known to the skilled person.

According to said methods of determining the size of the nanoparticles, the dimension of the nanoparticles according to the present invention makes reference either to the Stokes diameter (if the method used is that of sedimentation by centrifuging and X ray analysis), or to the diffusion diameter (if the method used is that of diffusion of light by laser granulometry), or to the diffraction diameter (if the method used is that of diffraction of light by laser granulometry), or to the width (l) of nanoparticles defined as the smallest dimension of the nanoparticles (if the method used is that of microscopic analysis, such as scanning electron microscopy (SEM) or transmission electron microscopy (TEM)); the latter method is preferred.

These four methods of determining the dimension of the nanoparticles may produce substantially different results. For this reason, the results Obtained must satisfy the nanometric dimension condition for the nanoparticles according to the invention for at least one of the four above-mentioned methods, preferably at least two of these methods, preferably at least three of these methods, and more preferably these four methods.

The dimension of the mineral nanoparticles of the invention is in particular at most 400 nanometers (nm), preferably at most 300 nm, and more preferably at most 100 nm.

Particularly preferably, the dimension of the mineral nanoparticles is in the range 0.1 nm to 80 nm, more preferably in the range 10 nm to 70 nm, for example equal to 40 nm.

The mineral nanoparticles of the present invention may advantageously be selected from nanoparticles of alkaline-earth metal carbonates, alkaline-earth metal sulfates, metallic oxides, oxides of metalloids, and/or siloxanes.

By way of example, the nanoparticles of alkaline-earth metal carbonates may be nanoparticles of calcium carbonate, those of alkaline-earth metal sulfates, nanoparticles of barium sulfate, those of metallic oxides, nanoparticles of alumina, of zinc oxide, or of titanium dioxide, those of oxides of metalloids, nanoparticles of silicon dioxide and those of siloxanes, nanoparticles of silsesquioxanes, and more particularly nanoparticles of trisilanolphenyl polyhedral silsesquioxane (TP-POSS).

Preferred mineral nanoparticles from this list are nanoparticles of calcium carbonate and alumina.

In accordance with a particular implementation, the mixing of step ii) may be accomplished using an extruder.

However, this mixing method is in no way limiting and any other method that is well known to the skilled person may be used.

In a further aspect, the present invention provides a transparent polymer material obtained by the preparation method defined above.

The transparent polymer material thus has rigidity with optimized transparency, very good abrasion resistance as well as shock resistance, and substantially non-existent yellowing type coloration.

The transparent polymer material may comprise at most 15% by weight of mineral nanoparticles.

This maximum quantity may firstly limit problems with rheology during mixing of the composite nanoparticles into the thermoplastic polycarbonate matrix in step ii) and may secondly limit the cost of the polymer material, all maintaining satisfactory transparency.

Furthermore, in order to guarantee both very good mechanical and optical properties, the transparent polymer material may comprise at most 10% by weight of mineral nanoparticles, preferably at most 5% by weight of mineral nanoparticles, and more preferably a quantity of the order of 1% by weight of mineral nanoparticles.

In a further aspect, the present invention provides the use of said transparent polymer material for the manufacture of optical articles such as automobile glass, sighting instrument lenses, helmet visors, or ophthalmic lenses.

As an example, the thickness of the optical articles may be at most 15 millimeters (mm), preferably in the range 0.1 mm to 5 mm, and more preferably in the range 0.5 mm to 4 mm.

Typically, the optical article may be manufactured from said transparent polymer material using any forming method that is well known to the skilled person, such as thermoforming, extrusion, calendering, drawing, injection, injection-compression or blow molding; the optical article retains all of the mechanical and optical properties of said polymer material.

More particularly, the mixing of step ii) may be accomplished using an extruder; the rod leaving the extruder is granulated then shaped by extrusion, injection or injection-compression to obtain the optical article.

In a further aspect, the present invention proposes the use of mineral nanoparticles that have been at least partially coated with at least one monomer and/or at least one polymer that can promote physicochemical interactions at the interface between the mineral nanoparticles and a thermoplastic polycarbonate matrix, said mineral nanoparticles being surface-modified by said monomer and/or said polymer either directly or via a coupling agent selected from chlorosilane or an organosilane comprising a functional group that is capable of reacting by a radical pathway, for the preparation of transparent polymer materials.

The modifications to said mineral nanoparticles may then be as described above.

Other characteristics and advantages of the present invention become apparent form the following examples; said examples are given by way of non-limiting illustration.

In order to demonstrate the advantages of the transparent polymer materials obtained by the preparation method of the present invention, the mechanical and optical properties of said materials were studied.

Prior to preparing the polymer materials, the mineral nanoparticles and the polycarbonate used in the examples below were oven dried under vacuum at 120° C. for at least 12 hours (h).

The various steps of modifying the surface of the mineral nanoparticles described in the examples below were carried out with Magnetic Dr Mechanical stirring.

DETAILED DESCRIPTION

Preparation Method P1

Modification of the Surface of Mineral Nanoparticles by a Monomer or a Polymer in the Presence of a Coupling Agent In accordance with a first preparation method P1 of the present invention, step i) is carried out in the presence of a coupling agent (CgA).

First Variation V1 of Method P1

Grafting Bisphenol a or Polycarbonate to the Surface of Mineral Nanoparticles in Presence of Chlorosilane In a first variation V1 of step i) of P1, 2.0 grams (g) of mineral nanoparticles was mixed into 600 g of chloroform at 60° C. in an inert atmosphere.

Excess chlorosilane was added to said mixture and it was then allowed to react for 2 hours until the excess chlorosilane had evaporated off. Silane-grafted mineral nanoparticles were thus obtained.

At the same time, a solution containing 50 g of bisphenol A or polycarbonate dissolved in 500 g of chloroform was prepared.

Said solution was added to the mixture and allowed to react for 12 hours to graft the bisphenol A or the polycarbonate to the surface of the silane-grafted mineral nanoparticles.

The temperature was then raised to 130° C. in order to evaporate off the solvent. The thus modified mineral nanoparticles were washed with chloroform by Soxhlet extraction for 16 hours, then oven dried at 80° C. for 24 hours.

Thus, composite nanoparticles in accordance with the first variation V1 of step i) of method P1 were obtained, namely:

Al-CgA-PC composite nanoparticles, corresponding to nanoparticles of alumina coated with polycarbonate;

Al-CgA-BPA composite nanoparticles, corresponding to nanoparticles of alumina coated with bisphenol A monomer, in other word's bisphenol A; and CC-CgA-PC composite nanoparticles, corresponding to nanoparticles of calcium carbonate coated with polycarbonate.

Second Variation V2 of Method P1

Grafting a Styrene Monomer to the Surface of Mineral Nanoparticles in the Presence of an Organosilane, then Polymerization of Said Monomer In accordance with a second variation V2 of step i) of P1, a styrene monomer was grafted to the surface of mineral nanoparticles then said monomer was polymerized in the presence of an initiator that could generate free radicals under the effect of heat.

20 g of mineral nanoparticles in 300 g of ethanol was mixed at 50° C., then a solution containing 20 g of vinyl trimethoxysilane diluted in 100 g of ethanol was added. The mixture was stirred at 50° C. for 16 hours.

The silane-grafted mineral nanoparticles were washed and recovered by centrifuging in ethanol.

The monomer was polymerized in a non-aqueous medium carried out in air in an Erlenmeyer flask equipped with a condenser.

The silane-grafted mineral nanoparticles were initially dispersed in tetrahydrofuran (THF), then the mixture was heated to a temperature of 70° C. and stirring was maintained.

When the mixture reached 70° C., benzoyl peroxide was added to said mixture as an initiator, along with the styrene monomer.

The mixture was allowed to react for 9 hours to polymerize the monomer (in situ polymerization).

The thus modified mineral nanoparticles were then washed in a Soxhlet and dried for 24 hours at 80° C.

Thus, composite nanoparticles in accordance with the second variation V2 of step i) of method P1 were obtained, namely:

Al-CgA-mPS composite nanoparticles, corresponding to nanoparticles of alumina coated with polystyrene obtained from in situ polymerization of styrene monomer; and CC-CgA-mPS composite nanoparticles, corresponding to nanoparticles of calcium carbonate coated with polystyrene obtained from in situ polymerization of styrene monomer.

After the first or the second variation of step i) of method P1, said step i) was followed by a step (step ii)) for mixing the composite nanoparticles with a polycarbonate matrix at a temperature of the order of 270-290° C.

The mixing of step ii) was carried out using a BC 21 C900 co-rotating twin screw type extruder sold by Clextral with a screw speed of 300 revolutions per minute.

The various transparent polymers MP obtained using the first preparation method P1 comprised 1% by weight of mineral nanoparticles.

Preparation Method P2

Modification of the Surface of Mineral Nanoparticles by a Monomer or a Polymer without the Presence of a Coupling Agent In accordance with a second preparation method P2 of the present invention, step i) was carried out in the presence of a coupling agent.

First Variation V1 of Method P2

Direct Adsorption of Polymethyl Methacrylate onto Surface of Mineral Nanoparticles In accordance with a first variation V1 of step i) of P2, the mineral nanoparticles were dispersed in chloroform and a solution containing polymethyl methacrylate dissolved in chloroform was added.

The mass of the polymer used was taken to be equal to the mass of the mineral nanoparticles to be processed.

The mixture was stirred at ambient temperature for 48 hours in order to adsorb said polymer directly onto the surface of the mineral nanoparticles.

The thus modified mineral nanoparticles were recovered by centrifuging then washed several times with chloroform before being oven dried at 80° C. for 12 hours.

Thus, composite Al-PMMA nanoparticles were obtained in accordance with the first variation V1 of step i) of the method P2, corresponding to nanoparticles of alumina coated with polymethyl methacrylate.

Second Variation V2 of Method P2

Direct Grafting of a Methyl Methacrylate Monomer onto the Surface of Mineral Nanoparticles then Polymerization of Said Monomer In accordance with a second variation V2 of step i) of P2, a methyl methacrylate monomer was grafted onto the surface of mineral nanoparticles, then said monomer was polymerized in the presence of an initiator that could generate free radicals under the effect of ultraviolet radiation.

10 g of mineral nanoparticles was dispersed in a crystallizer in 200 g of ethanol then agitated for 3 minutes using ultrasound.

Next, 0.2 g of benzophenone was added to this mixture as an initiator and said mixture was irradiated under an ultraviolet lamp for 2 hours.

The lamp used was a UV Fisher Bioblock lamp with a wavelength of 365 nm and power of 30 watts (W). The crystallizer was placed approximately 5 centimeters (cm) from the lamp. The mixture was stirred in an inert atmosphere during irradiation.

After the two hours, 10 g of said monomer was added and irradiation was maintained for 1 h 30 (in situ polymerization).

The thus modified mineral nanoparticles were washed with ethanol by centrifuging several times.

In order to dissolve the non-grafted polymer, the modified mineral nanoparticles were dispersed in THF, centrifuged several times and oven dried at 80° C. for 12 hours.

Thus, Al-mPMMA composite nanoparticles were obtained in accordance with the second variation V2 of step i) of method P2, corresponding to alumina nanoparticles coated with polymethyl methacrylate obtained by in situ polymerization of methyl methacrylate monomer.

After the first or second variation of step i) of the method P2, said step i) was followed by a step (step ii)) for mixing the composite nanoparticles with a polycarbonate matrix under the same conditions as for method P1.

The various transparent polymer materials PM obtained using the second preparation method P2 comprised 1% by weight of mineral nanoparticles.

Further, "reference" polymer materials RM were also prepared, as follows:

a first reference material RM1 was prepared solely from polycarbonate as is;

a second reference material RM2 was prepared by direct incorporation of alumina type mineral nanoparticles into a polycarbonate matrix under the conditions of step ii); and a third reference material RM3 was prepared by direct incorporation of calcium carbonate type mineral nanoparticles into a polycarbonate matrix under the conditions of step ii).

The polymer materials RM2 and RM3 comprised 1% by weight of mineral nanoparticles.

The origins of the various constituents mentioned in the preparation methods P1 and P2 or in the methods of obtaining the polymer materials RM1 to RM3 were as follows:

the polycarbonate of step i) was a thermoplastic polycarbonate marketed by Acros-Organics under the reference polycarbonate resin (CAS no 24936-68-3);

the polycarbonate matrix of step ii) and the polycarbonate for preparing the reference polymer materials were a thermoplastic polycarbonate marketed by Bayer under the reference Makrolon A12647;

the bisphenol A was marketed by Acros-Organics under the reference 4,4'-isopropylidenediphenol (CAS no 80-05-7);

the styrene monomer was marketed by Acros-Organics under the reference styrene (CAS no 100-42-5);

methyl methacrylate monomer was marketed by Aldrich under the reference methyl methacrylate (CAS no 80-62-6);

the polymethyl methacrylate was marketed by Arkema under the reference Altuglas;

the alumina nanoparticles had a dimension of 13 nm and were marketed by Degussa under the reference Aeroxide AluC;

the calcium carbonate nanoparticles were precipitated calcium carbonate particles with a dimension of 70 nm marketed by Solvay under the reference Socal® 31;

the chlorosilane was marketed by Acros-Organics under the reference silicon (IV) chloride (CAS no 10026-04-7);

the vinyl trimethoxysilane was marketed by Dow Corning under the reference Z-6300;

the benzophenone was marketed by Acros-Organics under the reference benzophenone (CAS no 119-61-9); and the benzoyl peroxide was marketed by Acros-Organics under the reference benzoyl peroxide (CAS no 94-36-0).

For greater accuracy, the dimensions of the Socal® 31 nanoparticles and those of the Aeroxide AluC nanoparticles were determined using TEM with a magnification of 40000 on about twenty images, initially dispersing these nanoparticles in ethanol then placing them on a copper screen and finally covering them with an amorphous transparent polymer film. This produced a width 1 or number average dimension of 70 nm for the Socal® 31 nanoparticles and 13 nm for the Aeroxide AluC nanoparticles.

Thus, in order to study the mechanical and optical properties of the polymer materials PM and RM, samples were produced by injection of granules obtained from polymer materials which had been extruded in the form of a rod.

The mechanical and optical properties studied for the materials obtained were respectively the bending modulus and the light transmission.

Bending Modulus

The bending modulus measurements were carried out on samples in the form of a dumbbell-shaped specimen with a thickness of 4 mm in accordance with ISO standard 527-2 type 1A.

The dumbbells were obtained from granulates of polymer materials RM and PM shaped using a SANDRETTO SERIE OTTO A.T. injection press.

The bending modulus characterizes the rigidity of a polymer material. The higher the bending modulus, the better the rigidity of said material.

It was determined in accordance with ISO standard 178 using an ADAMEL LHOMARGY DY 26 universal electromagnetic press controlled by TestWorks software.

Light Transmission

The light transmission measurements were carried out on samples in the form of dumbbell-shaped specimens with a thickness of 4 mm in accordance with ISO standard 527-2 type 1A under the same conditions as for the measurements of the mechanical properties.

The light transmission characterizes the transparency of the polymer material. The greater the light transmission, the better the transparency of said material.

It was determined in accordance with ISO standard 8980-3 pertaining to eyeglass lenses using a Cary 50 type spectrophotometer marketed by Varian.

In accordance with that standard, in order to obtain the value for the light transmission, the light transmission spectrum of the sample is determined by the products of the spectral distribution of the illuminant employed, and as a function of the selected type of observation.

The illuminant used was D65, reproducing daylight, and the selected observation was at 2°.

The results of the measurement of the mechanical and optical properties are summarized in the table below.

| Method | Variation | Nanocomposite | Polymer material | Bending modulus (GPa) | Light transmission (%) |
|---|---|---|---|---|---|
| / | / | / | RM1 | 2.35 | 81.8 |
| / | / | / | RM2 | 2.54 | 45.1 |
| / | / | / | RM3 | 2.47 | 51.2 |
| P1 | V1 | Al-CgA-PC | PM1 | 2.56 | 58.2 |
|  |  | Al-CgA-BPA | PM2 | 2.60 | 56.5 |
|  |  | CC-CgA-PC | PM3 | 2.63 | 50.9 |
|  | V2 | Al-CgA-mPS | PM4 | 2.60 | 71.1 |
|  |  | CC-CgA-mPS | PM5 | 2.59 | 54.6 |
| P2 | V1 | Al-PMMA | PM6 | 2.50 | 46.6 |
|  | V2 | Al-mPMMA | PM7 | 2.61 | 43.8 |

From these results, it appears that firstly the transparent polymer materials PM1, PM2, and PM4, and secondly PM5 clearly have a bending modulus together with a light transmission that are optimized compared with the respective polymer materials RM2 and RM3.

Furthermore, it should also be observed that the bending modulus of the transparent polymer materials PM3 and PM7 was significantly increased, with satisfactory light transmission compared with the polymer materials RM2 and RM3.

Finally, the transparent polymer material PM6 has both a satisfactory light transmission and a satisfactory bending modulus.

The invention claimed is:
1. A method of preparing a transparent polymer material, the method comprising the following steps:
i) obtaining composite nanoparticles comprising mineral nanoparticles at least partially coated with at least one monomer, wherein the monomer is selected from the group consisting of styrene, methyl methacrylate, butyl acrylate, bisphenol A, phosgene, diphenyl carbonate, acrylamide, and combinations thereof at least one polymer, wherein the polymer either one of selected from the group consisting of polystyrene, polycarbonate, polymethyl methacrylate, polybutyl acrylate, polyacrylamide, and combinations thereof, or a copolymer of the group consisting of styrene, polycarbonate monomer, methyl methacrylate, butyl acrylate, bisphenol A, acrylamide, and combinations thereof and combinations thereof, suitable for promoting physicochemical interactions at the interface between the mineral nanoparticles and a thermoplastic polycarbonate matrix, said mineral nanoparticles being surface-modified by said monomer, said polymer, and combinations thereof:

directly by grafting or directly by adsorption of the monomer, the polymer, and combinations thereof, onto the surface of said mineral nanoparticles wherein said mineral nanoparticles being surface-modified by said monomer, said polymer, and combinations thereof, directly by creating a hydrogen bond or creating Van der Waals bond, between the mineral nanoparticles from one hand, and the monomer, the polymer, and combinations thereof, from the other hand; and ii) mixing the composite nanoparticles obtained in step i) with the thermoplastic polycarbonate matrix in a molten state to obtain said transparent polymer material, said transparent polymer material including at most 10% by weight of said composite nanoparticles, wherein said transparent polymer material is a material through which an image is observed with no loss contrast.

2. The method according to claim 1, wherein the dimension of the mineral nanoparticles is at most 300 nm.

3. The method according to claim 1, wherein the mineral nanoparticles are selected from the group consisting of nanoparticles of alkaline-earth metal carbonates, alkaline-earth metal sulfates, metallic oxides, oxides of metalloids, siloxanes, and combinations thereof.

4. The method according to claim 3, wherein the mineral nanoparticles are selected from the group consisting of nanoparticles of calcium carbonate, barium sulfate, alumina, trisilanolphenyl polyhedral silsesquioxane (TP-POSS), zinc oxide, silicon dioxide, titanium dioxide, and combinations thereof.

5. The method according to claim 1, wherein the monomer of step i) is grafted to the surface of said nanoparticles, then the said monomer is polymerized.

6. The method according to claim 1, wherein the mixture of step ii) is produced using an extruder.

7. A transparent polymer material obtained by the method defined in claim 1.

8. A method of manufacture of optical articles for automobile glass, said method comprising the step of:

forming said optical articles for automobile glass with said polymer material according to claim 7.

9. A method of manufacture of optical articles of the sighting instrument lens, helmet visor or ophthalmic lens, said method comprising the step of:

forming said optical articles of the sighting instrument lens, helmet visor or ophthalmic lens with said polymer material according to claim 7.

10. A method of manufacture of optical articles with a thickness of at most 15 mm, said method as comprising the step of:

forming said optical articles with a thickness of at most 15 mm with said polymer material according to claim 7.

11. The method according to claim 2, wherein the dimension of the mineral nanoparticles is at most 100 nm.

12. The method according to claim 2, wherein the dimension of the mineral nanoparticles is in the range 10 nm to 70 nm.

13. The polymer material according to claim 7, wherein said polymer material is at most 5% by weight of mineral nanoparticles.

14. The polymer material according to claim 7, wherein said polymer material is a quantity of the order of 1% by weight of mineral nanoparticles.

15. A method of manufacture of optical articles with a thickness in the range 0.1 mm to 5 mm, said method as comprising the step of:

forming said optical articles with a thickness of at most 15 mm with said polymer material according to claim 7.

16. A method of manufacture of optical articles with a thickness in the range 0.5 mm to 4 mm, said method as comprising the step of:

forming said optical articles with a thickness of at most 15 mm with said polymer material according to claim 7.

17. A method of preparing a transparent polymer material, the method comprising the following steps:

i) obtaining composite nanoparticles comprising mineral nanoparticles at least partially coated with at least one monomer, at least one polymer, and combinations thereof, suitable for promoting physicochemical interactions at the interface between the mineral nanoparticles and a thermoplastic polycarbonate matrix, said mineral nanoparticles being surface-modified by said monomer, said polymer, and combinations thereof:

via an organosilane coupling agent including a functional group that is capable of reacting by a radical pathway and at least one hydrolysable functional group selected from an alkoxy and carboxy group, wherein the organosilane is vinyl trimethoxysilane or methacryloxypropyl trimethoxysilane; and ii) mixing the composite nanoparticles obtained in step i) with the thermoplastic polycarbonate matrix in a molten state to obtain said transparent polymer material, said transparent polymer material including at most 10% by weight of said composite nanoparticles, wherein the monomer of step i is selected from the group consisting of styrene, methyl methacrylate, butyl acrylate, bisphenol A, phosgene, diphenyl carbonate, acrylamide, and combinations thereof, the polymer of step i is selected from the group consisting of polystyrene, polycarbonate, polymethyl methacrylate, polybutyl acrylate, polyacrylamide, a copolymer of styrene, a copolymer of polycarbonate, a copolymer of methyl methacrylate, a copolymer of butyl acrylate, a copolymer of bisphenol A, a copolymer of acrylamide, and combinations thereof, and the functional group of the organosilane is selected from the group consisting of acrylate, methacrylate, vinyl, and allyl, wherein said transparent polymer material is a material through which an image is observed with no loss contrast.

18. The method of preparing a transparent polymer material according to claim 17, wherein said mineral nanoparticles being surface-modified by said monomer and/or said polymer directly by creating hydrogen bond, between the mineral nanoparticles from one hand, and the monomer and/or the polymer from the other hand.

* * * * *